US012028669B1

(12) United States Patent
Wu

(10) Patent No.: US 12,028,669 B1
(45) **Date of Patent: *Jul. 2, 2024**

(54) EXTERNAL MICROPHONE HEATER

(71) Applicant: Waymo LLC, Mountain View, CA (US)

(72) Inventor: Cheng-Han Wu, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,619

(22) Filed: Mar. 20, 2023

Related U.S. Application Data

(63) Continuation of application No. 16/945,015, filed on Jul. 31, 2020, now Pat. No. 11,638,079.

(51) Int. Cl.

| | |
|---|---|
| ***H04R 1/08*** | (2006.01) |
| ***H04R 1/04*** | (2006.01) |
| ***H04R 1/40*** | (2006.01) |
| ***H04R 3/00*** | (2006.01) |
| ***H05B 3/12*** | (2006.01) |
| ***H05B 3/34*** | (2006.01) |

(52) U.S. Cl.
CPC ............... *H04R 1/086* (2013.01); *H04R 1/04* (2013.01); *H04R 1/406* (2013.01); *H04R 3/005* (2013.01); *H05B 3/12* (2013.01); *H05B 3/34* (2013.01); *H04R 2499/13* (2013.01)

(58) Field of Classification Search
CPC .......... H04R 1/086; H04R 1/04; H04R 1/406; H04R 3/005; H04R 2499/13; H05B 3/12; H05B 3/34
USPC ................................ 381/122, 124, 302, 397
See application file for complete search history.

(56) References Cited

U.S. PATENT DOCUMENTS

| | | | |
|---|---|---|---|
| 3,781,566 | A | 12/1973 | Meuller |
| 4,891,796 | A | 1/1990 | Sekine |
| 5,528,224 | A | 6/1996 | Wang |
| 6,792,123 | B2 | 9/2004 | Pavlovic |
| 7,149,151 | B2 | 12/2006 | Byzio et al. |

(Continued)

FOREIGN PATENT DOCUMENTS

| | | |
|---|---|---|
| CN | 106612473 | 5/2017 |
| CN | 208956038 | 6/2019 |
| DE | 202008002648 | 7/2008 |

OTHER PUBLICATIONS

Avisoft, HCM 16, 2013, p. 9-p. 10.*

(Continued)

*Primary Examiner* — William A Jerez Lora
(74) *Attorney, Agent, or Firm* — McDonnell Boehnen Hulbert & Berghoff LLP

(57) ABSTRACT

Example embodiments described herein involve reducing the formation of ice on external modules by incorporating a heater within the module. The system may include a microphone module for an autonomous vehicle. The microphone module may include a housing and a microphone inside an opening of the housing. The system may further include a cover abutting the opening of the housing. The cover may enclose the microphone within the housing and seal the opening of the housing. The system may also include a heater adjacent to the opening of the housing and configured to prevent ice from forming over the opening. The heater may at least partially surround the opening.

20 Claims, 7 Drawing Sheets

(56) References Cited

U.S. PATENT DOCUMENTS

| | | | | |
|---|---|---|---|---|
| 9,253,297 | B2 | 2/2016 | Abe et al. | |
| 10,209,512 | B2 | 2/2019 | Bulgajewski et al. | |
| 2008/0013770 | A1* | 1/2008 | Wu | H04R 1/406 381/357 |
| 2018/0017785 | A1 | 1/2018 | Bulgajewski et al. | |
| 2018/0174940 | A1* | 6/2018 | Ferguson | H01L 23/345 |
| 2019/0283533 | A1 | 9/2019 | Lombrozo et al. | |
| 2020/0047717 | A1* | 2/2020 | Frederick | G02B 27/0006 |
| 2021/0202404 | A1 | 7/2021 | Eid et al. | |
| 2021/0204071 | A1 | 7/2021 | Pederson et al. | |
| 2021/0258698 | A1* | 8/2021 | Ow | H04R 19/04 |

OTHER PUBLICATIONS

Christopher Hammerschmidt, Film heaters ensure reliable deicing of ADAS sensors,MATEnet Interconnection System Designed for Harsh Automotive Environments, Oct. 10, 2019, 1 pg.

Avisoft, HCM, 2013, p. 9-10.

* cited by examiner

EXTERNAL MICROPHONE HEATER

CROSS-REFERENCE TO RELATED APPLICATION

The present application is a continuation of U.S. patent application Ser. No. 16/945,015, filed Jul. 31, 2020, the entire contents of which is herewith incorporated by reference.

BACKGROUND

Sensors may be used to detect objects in a surrounding environment, particularly during operation of a vehicle. Various types of sensors may be used on vehicles, including autonomous vehicles. Microphones are one type of sensor that may be used during the operation of an autonomous vehicle to detect sounds and the direction of sounds that could affect the operation of the vehicle. For example, microphone modules may be placed externally on autonomous vehicles to monitor and detect emergency vehicle sirens.

Microphone modules may be positioned on an external surface of an autonomous vehicle, possibly exposing the module to harsh weather conditions. A microphone module may include a housing for the external microphones to provide stability and protection for the microphones. The housing may include a shield over the microphones to reduce wind noise and prevent dust, debris, and water from entering the module.

SUMMARY

The present disclosure generally relates to reducing the formation of ice on external microphone modules by incorporating a heater within the module. Particularly, the heater may be disposed within a cover of the module and abutting the cover to defrost a front end of the microphone module.

In one aspect, the present application describes a system. The system includes a microphone module for an autonomous vehicle. The microphone module may include a housing and a microphone inside an opening of the housing. The system may further include a cover abutting the opening of the housing. The cover may enclose the microphone within the housing and seal the opening of the housing. The system may also include a heater adjacent to the opening of the housing and configured to prevent ice from forming over the opening. The heater may at least partially surround the opening.

In another aspect, the present application describes a system including a microphone module for an autonomous vehicle including a housing and a plurality of microphones. The plurality of microphones may be disposed within a plurality of openings in the housing, and the plurality of openings may be covered by a corresponding plurality of covers. The system may further include a plurality of heaters. Each heater of the plurality of heaters may be adjacent to and at least partially surround a respective opening of the plurality of openings in the housing.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION

Figure 1:
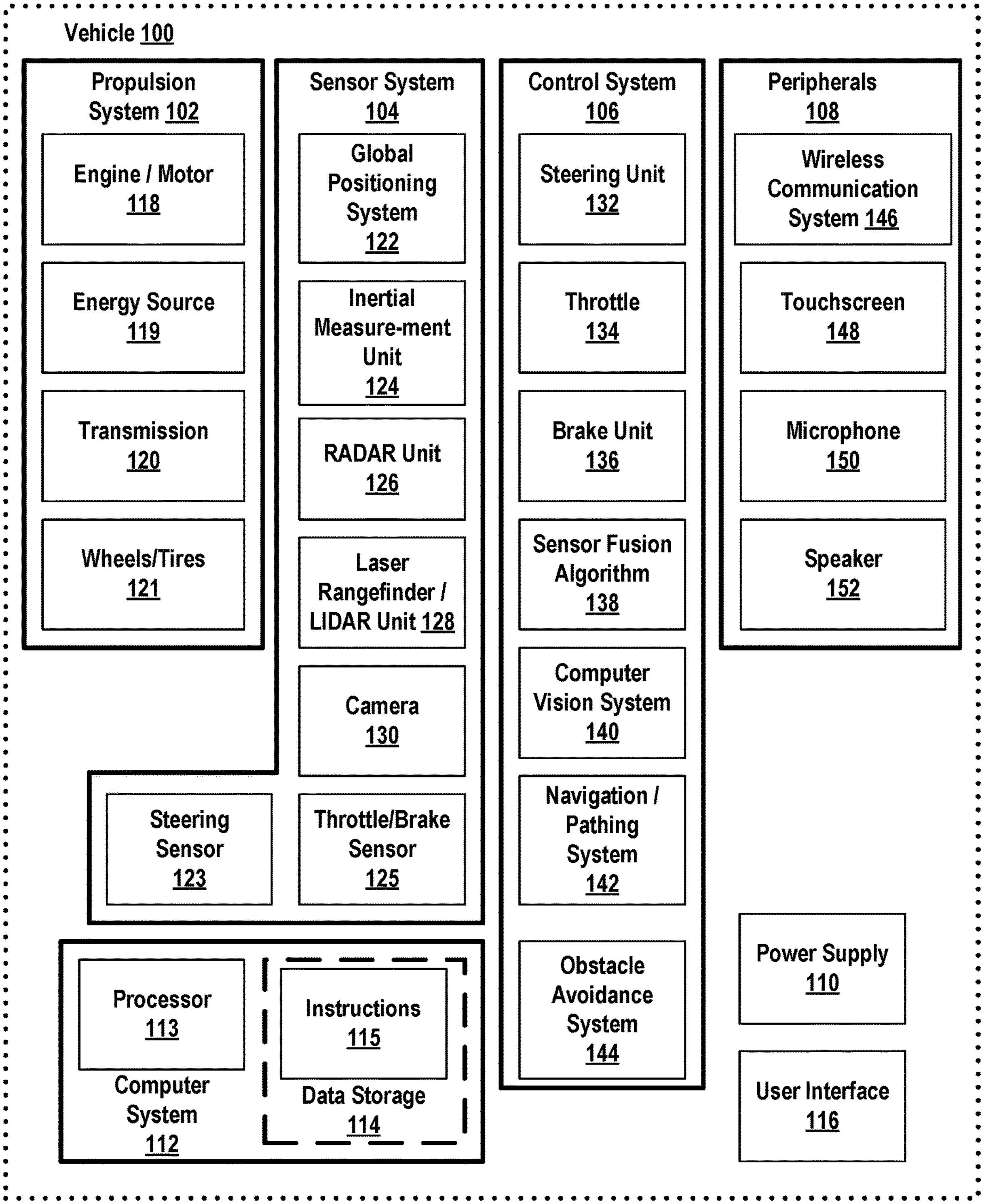
FIG. 1 is a functional block diagram illustrating a vehicle, according to one or more example embodiments.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

An autonomous vehicle may use microphones during operation to detect sounds around the vehicle. For example, the microphones may detect sounds ranging from the directional approach of a user to an emergency vehicle siren. Information gathered by the microphones may be used in determining driving instructions for the vehicle. Thus, it is beneficial to position the microphones on the autonomous vehicle in locations that facilitate the ability of the microphones to detect sounds in the environment of the vehicle. To increase effectiveness of microphones for an autonomous vehicle, the microphones may be placed on the roof of the vehicle, for example.

Positioning a microphone module on the roof of an autonomous vehicle may allow for the microphones to detect sounds effectively. However, it may also expose the microphones to harsh weather conditions. For example, on the roof of an autonomous vehicle the microphone module may experience wind and rain that may interfere with the microphones' performance. To protect the microphones from wind and rain, the module may be equipped with a housing to enclose the microphones, including a cover to shield the opening that the microphones are inserted into. The housing and cover, however, do not necessarily prevent ice from forming over the module.

During operation in harsh weather conditions at low temperatures, ice may form over the cover that encloses the microphone in the housing. In some instances, the ice may impede operation of the microphone by muffling or blocking sounds from reaching the microphone inside of the housing. Thereby negatively affecting the performance of the autonomous vehicle.

Example embodiments presented herein may involve a system for preventing ice from forming on a microphone module. For instance, a microphone module for an autonomous vehicle may include a housing. The microphone may be positioned inside an opening of the housing to protect the microphone from harsh weather, but still allow the microphone to detect sounds. To protect the microphone, the module may further include a cover abutting the opening of the housing. The cover may enclose the microphone within the housing and seal the opening of the housing to prevent water from entering the housing. The cover may also prevent water and debris from entering the module. As such, the cover may be made of a material or materials that allow sound to enter the housing and reach the microphone, but prevents water from entering. Further, the microphone module housing may include a heater adjacent to the opening of the housing. The heater may at least partially surround the opening of the housing and prevent ice from forming over the opening. The heater may not only prevent ice from forming on the opening of the housing, but prevent ice from forming over an entire face of the housing. Thereby improving the performance of the microphones during harsh weather conditions at low temperatures.

The following detailed description may be used with an apparatus (e.g. microphone module unit) having one or multiple microphones. The one or multiple microphones may take the form of a single microphone module. The multiple microphones may increase the performance of the module. The microphone module may be equipped with one heater that defrosts at least part of a face of the microphone module. Alternatively, the microphone module may be equipped with multiple heaters that defrost covers of the multiple microphones. Some example embodiments in the detailed description may be used with an apparatus that is not limited to a microphone. For example the module may include at least one transducer, such as a speaker.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors (e.g., microphones), among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

Figure 3:
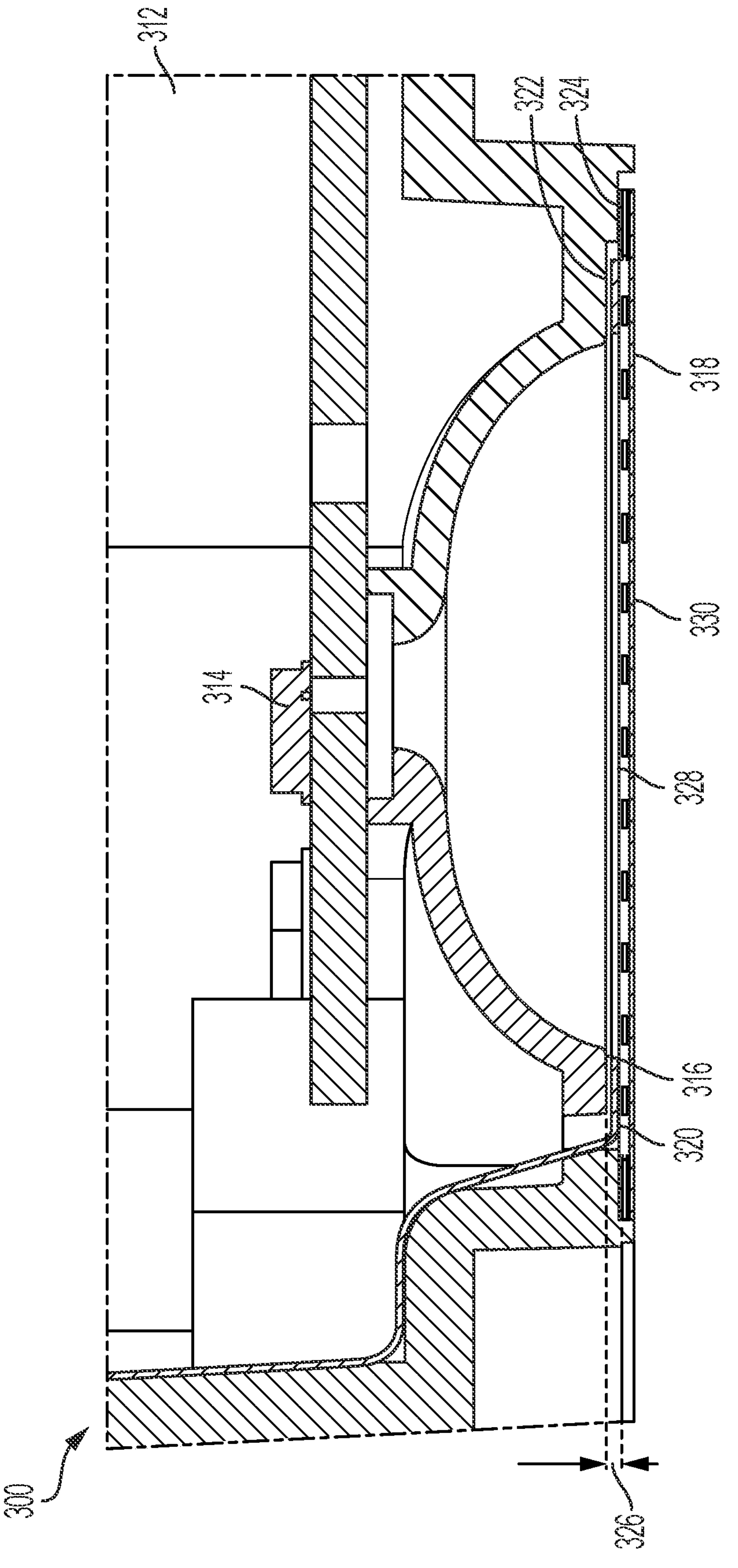
FIG. 3 illustrates a cross-sectional view of a microphone module according to one or more example embodiments.

FIG. 3 illustrates a cross-sectional view of a layout of a microphone module 300, according to one or more embodiments. As discussed above, the microphone module 300 may be one sensor used in operation of an autonomous vehicle. The microphone module 300 may detect sounds in the environment of the autonomous vehicle. Information gathered from the microphone module 300 may be used as an input for operation of the autonomous vehicle. To protect the module from weather such as wind and rain, the microphone module may include a housing 312. The housing may be made of a variety of materials including plastics, metals, or metal alloys. Additionally, the housing 312 may be a variety of shapes to allow the components for the microphone module 300 to fit within the housing 312. For example, the housing may be a triangular shape, a rectangular shape, or a spherical shape.

The microphone module 300 may further include a microphone 314. The microphone 314 may be used to monitor sounds surrounding the autonomous vehicle. The microphone 314 may be any type of microphone that is capable of detecting sounds in the environment of the vehicle. For example, the microphone 314 may be a cardioid microphone, a supercardioid microphone, or a hypercardioid microphone. Alternatively the microphone 314 may be an omnidirectional microphone, a multi-directional microphone, or a multi-pattern microphone. In an example embodiment, the microphone 314 may be a surface mounted Micro-Electro-Mechanical System (MEMS) microphone. Additionally the microphone 314 may be any size that enables the microphone to fit within a microphone module that is mounted to the exterior of the vehicle. For example, the microphone may be approximately 27 millimeters to 130 millimeters to compactly fit within the microphone module.

The microphone 314 may be positioned within the housing 312 to protect the microphone 314 from harsh weather conditions. Alternatively, a shield may be positioned around the outside of the microphone to protect the microphone. Further still, the microphone may sit in a recess of the housing. In an example embodiment, the microphone 314 may be positioned inside an opening 316 of the housing 312. The opening 316 of the housing 312 may be an entry into the inside of the housing. In the housing, the microphone 314 may be positioned adjacent to the opening, but not immediately inside the opening 316. Alternatively, the microphone may be positioned immediately inside the opening of the housing.

The microphone module may further include a cover 318 abutting the opening 316 of the housing 312. The cover 318 may enclose the microphone 314 within the housing 312 and seal the opening 318 of the housing 312. The cover 318 may prevent precipitation and debris from entering the microphone module and interfering with the performance of the microphone. The cover 318 may be sealed to the opening 316 in a variety of ways. For example, the cover 318 may be glued to the opening 316, or welded to the opening 316 to create a seal. Alternatively or in addition to, the cover may be screwed, nailed or bolted to housing. The cover 318 may be made of a variety of materials that allow sound to reach the microphone 314. For example, the cover may be made of a pliable material such as rubber, or plastic, or a stiff material such as a metal mesh.

Further, as shown in FIG. 3, a heater 320 is adjacent to the opening 316 of the housing 312. The heater 320 may be configured to prevent ice from forming over the opening 316 of the housing 312. The heater 320 may prevent water that accumulates on the cover 318 of the housing 312 from freezing by distributing heat over the cover 318. The heater 320 may also distribute heat over a face of the microphone module to prevent ice from forming on the entire module. Further, the heater 320 may at least partially surround the opening 316 of the housing 312. The heater 320 may surround the opening 316 in whatever shape the opening 316 is. For example, the opening 316 and the heater 320 may both be circular. Alternatively, the opening and the heater may be different shapes. For example, the opening may be circular and the heater may be a square. In an example embodiment, the heater 320 may border the opening 316. The heater 320 may have a slightly bigger circumference than the opening 316 such that the heater 320 is at the edge of the opening 316 and wider than the opening 316. In an alternative embodiment, the heater may not border the opening. For example, there may be a gap between the heater and the opening.

In an example embodiment of the microphone module, as shown in FIG. 3, the opening 316 of the housing 312 includes a first recessed edge 322 and a second recessed edge 324. The first recessed edge 322 and the second recessed edge 324 could form an indent around the lip of the opening. For example, the first recessed edge 322 and the second recessed edge 324 could form depressed tiers into the opening 316. Alternatively, the first recessed edge and the second recessed edge could be separate depressions in the housing.

In an example embodiment, the first recessed edge 322 and the second recessed edge 324 may be different depths. For example, the first recessed edge 322 could be a deeper depth than the second recessed edge 324. Alternatively, the second recessed edge could be a deeper depth than the first recessed edge, or the first recessed edge and the second recessed edge could be the same depth. Further, as shown in FIG. 3, the first recessed edge 322 may be adjacent to the opening 316 of the housing 312 and the second recessed edge 324 could be positioned outside of the first recessed edge 322 such that the first recessed edge 322 sits between the second recessed edge 324 and the opening 316. Alternatively, the second recessed edge could be adjacent to the opening.

The recessed edges of the housing may be used to accommodate elements of the microphone module. In an example embodiment, the heater 320 may be disposed in the first recessed edge 322 and the cover 318 may be disposed in the second recessed edge 324. The heater 320 and the cover 318 may be arranged such that the heater 320 could be disposed between the microphone 314 and the cover 318. As previously discussed, the microphone 314 may be positioned within the module 300. The cover 318 may be on the outside of the module 300 with the heater 320 directly inside the module 300 adjacent to the cover 320. Alternatively, the heater could be disposed in the second recessed edge with the cover disposed in the first recessed edge. In another alternative embodiment, the heater could be disposed outside the module and outside of the cover.

In the embodiment depicted in FIG. 3, there could be a clearance depth 326 between the heater 320 and the cover 318. The clearance depth 326 may assist in regulating the temperature of the heater 320. The clearance depth 326 may be between 0.4 millimeters and 0.8 millimeters. In an alternative embodiment, the heater may abut the cover.

As previously discussed, the cover may be disposed over the opening of the microphone module to seal the opening and prevent wind and water from reaching the microphone. Therefore, the cover 318 may be made from various materials. For example, the cover 318 abutting the opening 316 of the housing 312 may include at least one of a metal mesh 328 or a membrane. In an example embodiment, the cover 318 could include both the metal mesh and the membrane together. The materials for the cover 318 and the metal mesh 328 may be good conductors of heat, while maintaining the capability to withstand high temperatures so that heat may be evenly distributed. Moreover, the metal mesh 328 may be coated to prevent corrosion. The use of both materials together may provide greater protection from harsh weather conditions, but still allow sound to reach the microphone in the module. The cover 318 could include the metal mesh 328 disposed between the opening and the membrane 330 such that the membrane 330 is subjected to the elements outside of the module 300. Alternatively, the membrane could be disposed between the opening and the metal mesh. Further, the cover could be made of other materials such as plastic, or fabric. In other possible embodiments, the membrane may be a diaphragm.

The heater in the microphone module may be positioned in a small space adjacent to the areas of the module most in need of preventing ice. In an example embodiment, the heater may be a ring heater. The heater may be various types of heaters that fit in the first recessed edge of the housing. For example, in one embodiment, the heater 320 may be a copper flex heater such as a kapton heater. Additionally, the copper flex heater may include copper traces. Using a copper flex heater may allow for the heater to be particularly thin in an attempt to minimize the size of the microphone module 300. The heater 320 should also be capable of reaching temperatures high enough to prevent ice from forming on the cover. The use of copper heaters may assist in reaching high enough temperatures to prevent ice from forming. Alternatively, the heater may be any type that fits within the microphone module and reaches a high enough temperature.

Figure 2A:
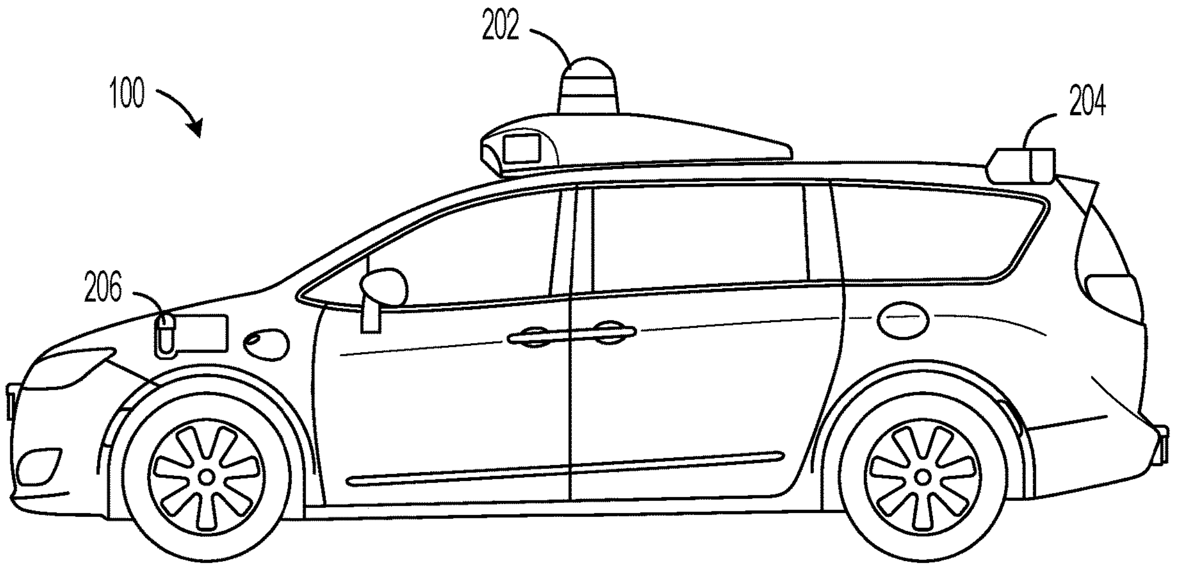
FIG. 2A illustrates a side view of a vehicle, according to one or more example embodiments.
Figure 2B:
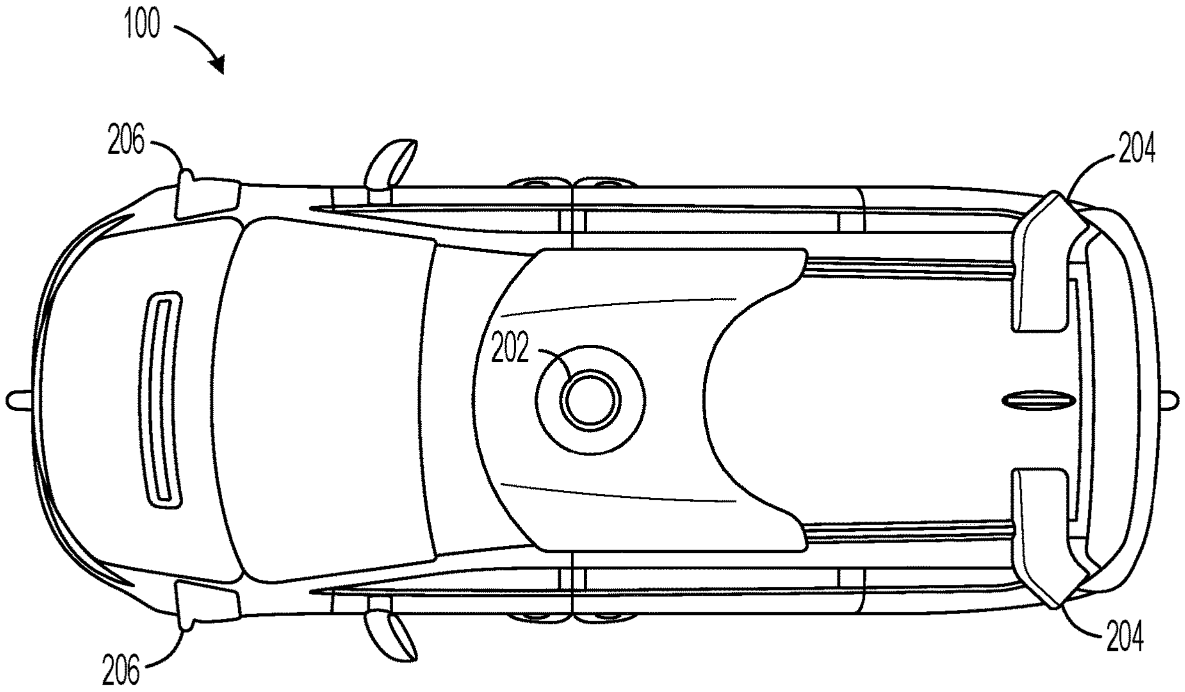
FIG. 2B illustrates a top view of a vehicle, according to one or more example embodiments.
Figure 2C:
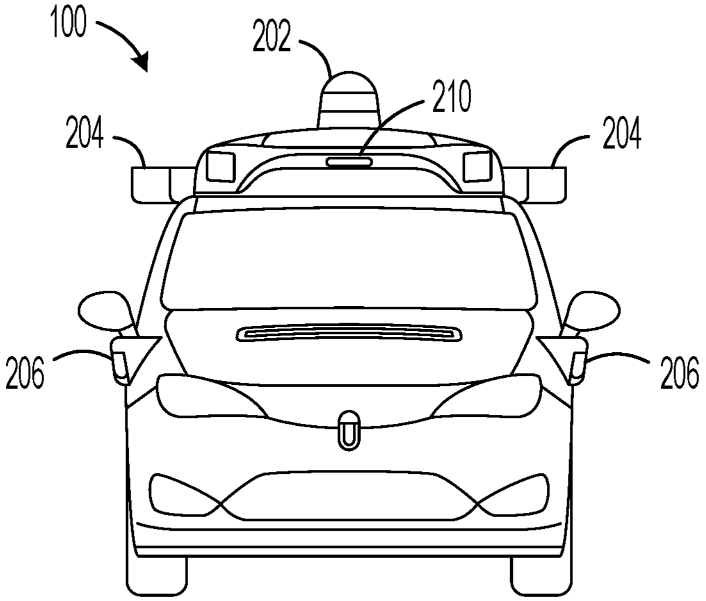
FIG. 2C illustrates a front view of a vehicle, according to one or more example embodiments.
Figure 2D:
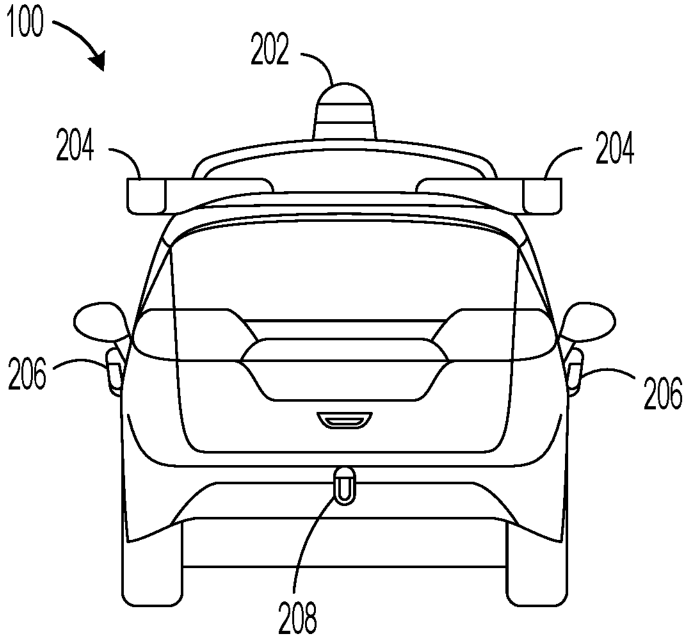
FIG. 2D illustrates a back view of a vehicle, according to one or more example embodiments.
Figure 2E:
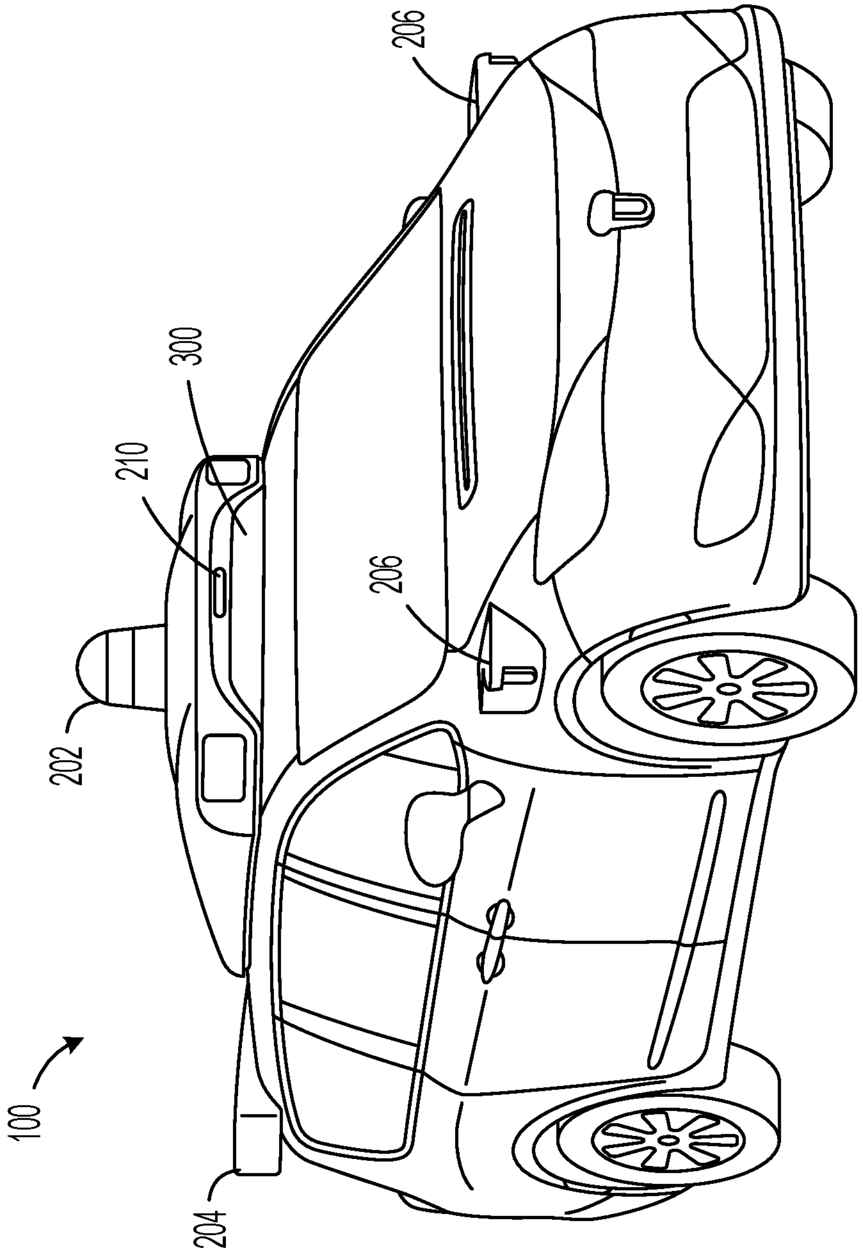
FIG. 2E illustrates an additional view of a vehicle, according to one or more example embodiments.

In an example embodiment, the above described microphone module may be used on an autonomous vehicle. FIG. 2E illustrates an embodiment of the microphone module 300. The microphone module 300 may be a sensor that provides feedback used for driving instructions to the vehicle 100. The microphone module 300 should be in a position that allows the microphone to detect sounds from the surrounding environment. As shown in FIG. 2E, the microphone module 300 may be positioned on a roof of the autonomous vehicle.

Figure 4:
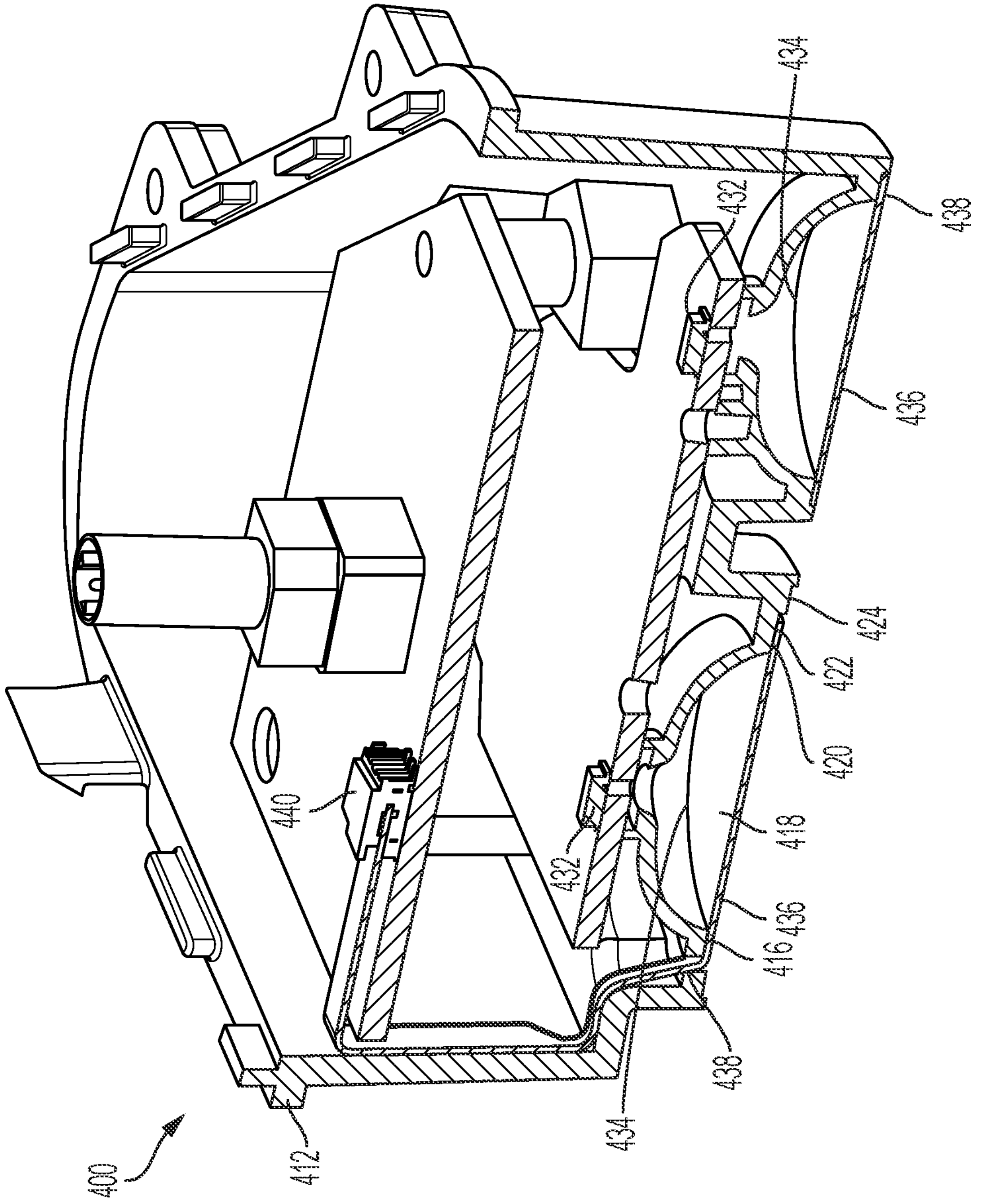
FIG. 4 illustrates a cross-sectional view of a microphone module with multiple microphones according to one of more example embodiments.

FIG. 4 illustrates a cross-sectional view of a layout of a microphone module 400, according to one or more embodiments. As discussed above, the microphone module 400 may be used in operation of an autonomous vehicle to detect sounds in the environment of the autonomous vehicle and update how an autonomous vehicle is driven. To protect the module from weather such as wind and rain, the microphone module may include a housing 412. The housing 412 may be made of a variety of materials including plastics, metals, or metal alloys. Additionally, the housing 412 may be a variety of shapes to allow the components for the microphone module 400 to fit within the housing 412. For example, the housing 412 may be a triangular shape, a rectangular shape, or a spherical shape.

In order to more accurately detect sounds in the autonomous vehicle's environment, the microphone module may include a plurality of microphones 432. The plurality of microphones 432 may be positioned in the housing so as to facilitate gathering noises from different directions. The plurality of microphones may be picked from a variety of microphone types. For example, at least one microphone in the plurality of microphones may be chosen from a group including cardioid microphones, supercardioid microphones, hypercardioid microphones, omnidirectional microphones, multi-directional microphones, or multi-pattern microphones. Additionally, each microphone in the plurality of microphones 432 may be any size that enables the microphone to fit within a microphone module that is mounted to the exterior of the vehicle. For example, the microphone may be approximately 27 millimeters to 130 millimeters to compactly fit within the microphone module.

The microphones 432 may be positioned within the housing 412 to protect the microphones 432 from harsh weather conditions. Alternately, the microphones may sit in recesses of the housing. In an example embodiment, the plurality of microphones 432 may be disposed within a plurality of openings 434 of the housing 412. The plurality of openings 434 of the housing 412 may be an entry to the interior of the housing. In the housing, each microphone in the plurality of microphones 432 may be positioned adjacent to the plurality of openings 434, but not immediately inside the corresponding opening. Alternatively, the microphones may be positioned immediately inside the plurality of openings of the housing.

The microphone module 400 may further include the plurality of openings 434 covered by a corresponding plurality of covers 436. The covers 436 may enclose the microphones 432 within the housing 412 and seal the openings 434 of the housing 412. The covers 436 may prevent precipitation and debris from entering the microphone module and interfering with the performance of the microphones. Therefore, the covers 436 may be sealed to the opening 434 in a variety of ways. For example, the covers may be glued to the openings, or welded to the openings to create a seal. Alternatively or in addition to, the covers may be screwed, nailed or bolted to the housing. The covers 436 may be made of a variety of materials that allow sound to reach the microphones 432. For example, the covers may be made of a pliable material such as rubber, or plastic, or a stiff material such as a metal.

Further, as shown in FIG. 4, the microphone module 400 may include a plurality of heaters 438. Each heater in the plurality of heaters 438 may be adjacent to a respective opening of the plurality of openings 434 in the housing 412. Each heater in the plurality of heaters 438 may be configured to prevent ice from forming over the openings 434 of the housing 412. The plurality of heaters 438 may distribute heat over a face of the microphone module 400 to prevent ice from forming on the entire module 400. It may be possible that only one heater is needed to distribute heat over the face of the microphone module that the covers are disposed on.

Further, the plurality of heaters 438 may at least partially surround a respective opening 416 of the plurality of openings 434 in the housing 412. The plurality of heaters 438 may take the shape of the openings 434 that the heaters 438 surround. The shape of the heaters 438 may be designed to allow clear audio transmission and to provide heat without affecting the acoustic performance of the module. For example, the openings 434 and the heaters 438 may be circular. Alternatively, the openings and the heaters may be different shapes. For example, the openings may be circular and the heaters may be a square. In an example embodiment, the heaters 438 border the openings 434. For example, the heaters 438 may sit at the edges of the openings 434. In an alternative embodiment, the heaters may not border the openings. For example, there may be a housing gap between the heaters and the openings.

In operation, debris may accumulate on the autonomous vehicle, especially edges that are not flush. Therefore, components of the microphone module 400 may be recessed into the module 400 so that they are flush. In an example embodiment of the microphone module 400, as shown in FIG. 4, each opening of the plurality of openings 434 of the housing 412 may include a first recessed edge 422 and a second recessed edge 424. The recessed edges may assist in making components flush with the microphone module. The first recessed edge 422 and the second recessed edge 424 could form an indent around the lip of the respective opening. For example, the first recessed edge 422 and the second recessed edge 424 could be tiers into the opening 416. Alternatively, the first recessed edge and the second recessed edge could be separate depressions in the housing. In an example embodiment, the first recessed edge 422 and the second recessed edge 424 may be different depths. For example, the first recessed edge 422 could be a deeper depth than the second recessed edge 424. Alternatively, the second recessed edge could be a deeper depth than the first recessed edge, or the first recessed edge and the second recessed edge could be the same depth. Further, as shown in FIG. 4, the first recessed edge 422 may be adjacent to the opening 416 of the housing 412 and the second recessed edge 424 could be positioned outside of the first recessed edge 422 such that the first recessed edge 422 sits between the second recessed edge 424 and the opening 416. Alternatively, the second recessed edge could be adjacent to the opening.

The recessed edges of the housing may be used to accommodate elements of the microphone module. In an example embodiment, a respective heater 420 of the plurality of heaters 438 could be disposed in the first recessed edge 422 and a respective cover 418 of the plurality of covers 436 could be disposed in the second recessed edge 424. The plurality of covers 436 could be positioned on an outside face of the module 400 with the plurality of heaters 420 disposed adjacent to the plurality of covers 436 and configured to prevent ice from forming over the cover 418. The respective heater 420 and the respective cover 418 may be arranged such that the respective heater 420 could be disposed between a respective microphone 414 in the plurality of microphones 432 and the respective cover 418. Alternatively, the respective heater could be disposed in the second recessed edge with the respective cover disposed in the first recessed edge.

Given that there are multiple electrical components in the microphone module, the module may include a way to control the electrical aspects concurrently and also have a common connection for the electrical aspects. In an example embodiment, as shown in FIG. 4, the microphone module 400 may include a printed circuit board (PCB) 440. The PCB 440 may be electrically connected to the microphones 432. The PCB 440 may include various components such as processors, controllers, and power supplies. Information gathered from the microphones during operation may be gathered and processed by the components in the PCB. Further, in an example embodiment, the plurality of heaters 438 are electrically coupled to the PCB 440. The PCB 440 may control the operation of the heaters 438. The PCB 440 may also be configured to supply power to the microphones 432 and the heaters 438. In an alternative embodiment, the microphones and the heaters may be supplied with power from a different source.

Figure 5:
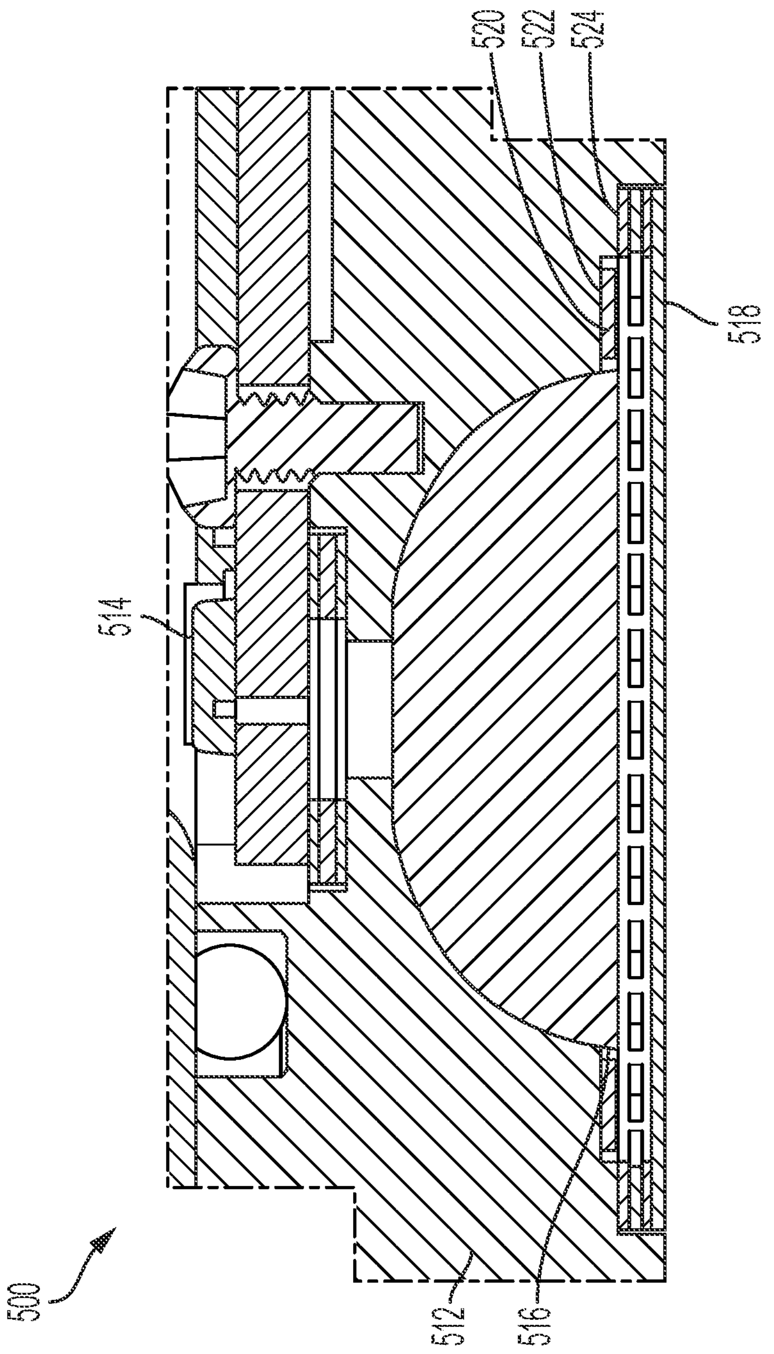
FIG. 5 illustrates a cross-sectional view of a transducer module according to one or more example embodiments.

FIG. 5 illustrates a cross-sectional view of a layout of a transducer module 500, according to one or more embodiments. The transducer module 500 may be used to detect sounds in the environment of the module, or output sounds into the environment of the module. To offer greater protection, the transducer module 500 may include a housing 512. The housing 512 may be made of a variety of materials including plastics, metals, or metal alloys. Additionally, the housing 512 may be a variety of shapes to allow the components for the transducer module 500 to fit within the housing 512. For example, the housing 512 may be a triangular shape, a rectangular shape, or a spherical shape.

The transducer module 500 may further include a transducer 514. The transducer 514 may be a variety of types. For example, the transducer could be a microphone or a speaker. The microphone may be of any acceptable type that is capable of gathering surrounding noises. For example, the microphone may be a cardioid microphone, a supercardioid microphone, a hypercardioid microphone, an omnidirectional microphone, a multi-directional microphone, or a multi-pattern microphone. In an example embodiment, the microphone 314 may be a surface mounted Micro-Electro-Mechanical System (MEMS) microphone. The speaker may be chosen from various types of speakers as well. Additionally the transducer 514 may be any size that enables the transducer to fit within a transducer module that is mounted to the exterior of the vehicle. For example, the transducer may be approximately 27 millimeters to 130 millimeters to compactly fit within the transducer module.

The transducer 514 may be positioned within the housing 512 to protect the transducer 514 from harsh weather conditions. Alternately, the module could have a shield around the outside of the transducer. Further still, the transducer may sit in a recess of the housing. In an example embodiment, the transducer 514 may be positioned inside an opening 516 of the housing 512. The opening 516 of the housing 512 may be an entry into the inside of the housing. In the housing, the transducer 514 may be positioned adjacent to the opening, but not immediately inside the opening 516. Alternatively, the transducer may be positioned immediately inside the opening of the housing.

The transducer module 500 may further include a cover 518 abutting the opening 516 of the housing 512. The cover 518 may enclose the transducer 514 within the housing 512 and seal the opening 516 of the housing 512. The cover 518 may prevent precipitation and debris from entering the transducer module and interfering with the performance of the transducer. Therefore, the cover 518 may be sealed to the opening 516 in a variety of ways. For example, the cover may be glued to the opening, or welded to the opening to create a seal. Alternatively or in addition to, the cover may be screwed, nailed or bolted to housing. The cover 518 may be made of a variety of materials. For example, the cover may be made of a pliable material such as rubber, or plastic, or a stiff material such as a metal. The cover may also include multiple materials. In one embodiment, the cover 518 includes at least one of a membrane and a metal mesh. In other embodiments, the membrane may include a diaphragm and may be made of a flexible material. The membrane may be layered over the outside of the metal mesh to protect from debris, and prevent most precipitation from entering the module.

As shown in FIG. 5, the transducer module 500 may also include a heater 520 adjacent to the opening 516 of the housing 512. The heater 520 may be configured to prevent ice from forming over the opening 516 of the housing 512 by distributing heat over the cover 518. The heater 520 may also distribute heat over a face of the microphone module to prevent ice from forming on the module face. Further, the heater 520 may at least partially surround the opening 516 of the housing 512. The heater 520 and the opening 516 may form the same shape. For example, the opening 516 and the heater 520 may both be circular. Alternatively, the opening and the heater may be different shapes. For example, the opening may be circular and the heater may be a square. In an example embodiment, the heater 520 may border the opening 516. For example, the heater 520 may be slightly bigger than the opening 516 such that the heater 520 is at the edge of the opening 516. In an alternative embodiment, the heater may not border the opening. For example, there may be a gap between the heater and the opening.

In an example embodiment of the transducer module 500, as shown in FIG. 5, the opening 516 of the housing 512 includes a first recessed edge 522 and a second recessed edge 524. The first recessed edge 522 and the second recessed edge 524 could form an indent around the lip of the opening 516. For example, the first recessed edge 522 and the second recessed edge 524 could be tiers into the opening 516. Alternatively, the first recessed edge and the second recessed edge could be separate depressions in the housing. In an example embodiment, the first recessed edge 522 and the second recessed edge 524 may be different depths. For example, the first recessed edge 522 could be a deeper depth than the second recessed edge 524. Alternatively, the second recessed edge could be a deeper depth than the first recessed edge, or the first recessed edge and the second recessed edge could be the same depth. Further, as shown in FIG. 5, the first recessed edge 522 may be adjacent to the opening 516 of the housing 512 and the second recessed edge 524 could be positioned outside of the first recessed edge 522 such that the first recessed edge 522 sits between the second recessed edge 524 and the opening 516. Alternatively, the second recessed edge could be adjacent to the opening.

The recessed edges of the housing may be used to accommodate elements of the microphone module. In an example embodiment, the heater 520 may be disposed in the first recessed edge 522 and the cover 518 may be disposed in the second recessed edge 524. The heater 520 and the cover 518 may be arranged such that the heater 520 could be disposed between the transducer 514 and the cover 518. As previously discussed, the transducer 514 may be positioned within the housing 512. The cover 518 may be on the outside of the module 500 with the heater 520 directly inside the module 500 adjacent to the cover 520. Alternatively, the heater could be disposed in the second recessed edge with the cover disposed in the first recessed edge.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:

a microphone module, wherein the microphone module comprises a housing and a microphone inside an opening of the housing, wherein the opening of the housing includes a first recessed edge;

a cover abutting the opening of the housing; and a heater adjacent to the opening of the housing and the cover, wherein the heater is disposed in the first recessed edge and at least partially surrounds the opening.

2. The system of claim 1, wherein the opening of the housing includes a second recessed edge, and wherein the cover is disposed in the second recessed edge.

3. The system of claim 2, wherein the cover encloses the microphone within the housing and seals the opening of the housing.

4. The system of claim 3, wherein the heater is disposed between the microphone and the cover and there is a clearance depth between the heater and the cover.

5. The system of claim 4, wherein the clearance depth is between 0.4 millimeters and 0.8 millimeters.

6. The system of claim 1, wherein the cover abutting the opening of the housing comprises at least one of a metal mesh or a membrane.

7. The system of claim 6, wherein the cover further comprises the membrane disposed between the opening and the metal mesh.

8. The system of claim 1, wherein the heater is configured to prevent ice from forming over the opening.

9. The system of claim 8, wherein the heater is a copper flex heater, and wherein the copper flex heater includes copper traces.

10. The system of claim 1, wherein the microphone module is positioned on a roof of an autonomous vehicle.

11. A system comprising:

a microphone module, wherein the microphone module comprises a housing and a plurality of microphones, wherein the plurality of microphones are disposed within a plurality of openings in the housing, wherein each opening of the plurality of openings includes a respective first recessed edge, and wherein the plurality of openings are abutted by a corresponding plurality of covers; and a plurality of heaters, wherein each heater of the plurality of heaters is disposed in the first recessed edge of a respective opening of the plurality of openings in the housing and at least partially surrounds the respective opening.

12. The system of claim 11, wherein each opening of the plurality of openings includes a respective second recessed edge in which a respective cover of the plurality of covers is disposed.

13. The system of claim 11, wherein the microphone module includes a printed circuit board (PCB) electrically connected to the plurality of microphones.

14. The system of claim 13, wherein the plurality of heaters are electrically coupled to the PCB.

15. The system of claim 14, wherein the plurality of heaters are disposed adjacent to the plurality of covers and configured to prevent ice from forming over the cover.

16. A system comprising:

a transducer module, wherein the transducer module comprises a housing and a transducer inside an opening of the housing, wherein the opening of housing includes a first recessed edge;

a cover abutting the opening of the housing; and a heater adjacent to the opening of the housing, wherein the heater is disposed in the first recessed edge.

17. The system of claim 16, wherein the cover encloses the transducer within the housing and seals the opening of the housing.

18. The system of claim 17, wherein the cover comprises at least one of a membrane and a metal mesh.

19. The system of claim 16, wherein the opening of the housing includes a second recessed edge, wherein the cover is disposed in the second recessed edge.

20. The system of claim 19, wherein the heater is disposed between the transducer and the cover.

* * * * *